(12) United States Patent
Wang et al.

(10) Patent No.: US 12,411,216 B2
(45) Date of Patent: Sep. 9, 2025

(54) OMNI-VIEW PERIPHERAL SCANNING SYSTEM WITH INTEGRATED MEMS SPIRAL SCANNER

(71) Applicant: BEIJING VOYAGER TECHNOLOGY CO., LTD., Beijing (CN)

(72) Inventors: Youmin Wang, Berkeley, CA (US); Yue Lu, Mountain View, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 1036 days.

(21) Appl. No.: 17/470,039

(22) Filed: Sep. 9, 2021

(65) Prior Publication Data
US 2023/0072058 A1 Mar. 9, 2023

(51) Int. Cl.
*G01S 7/48* (2006.01)
*G01S 7/481* (2006.01)
*G01S 17/931* (2020.01)

(52) U.S. Cl.
CPC .......... *G01S 7/4817* (2013.01); *G01S 17/931* (2020.01)

(58) Field of Classification Search
None
See application file for complete search history.

(56) References Cited

U.S. PATENT DOCUMENTS

| | | | | |
|---|---|---|---|---|
| 7,336,345 B2 * | 2/2008 | Krasutsky | ............... | G01S 7/481 356/4.1 |
| 10,101,457 B1 * | 10/2018 | Topliss | ................. | G02B 26/101 |
| 10,509,198 B1 * | 12/2019 | Zhou | .................. | G02B 26/0841 |
| 2002/0054433 A1 * | 5/2002 | Tacklind | ............ | G02B 27/1073 359/627 |
| 2004/0107588 A1 * | 6/2004 | Pu | ........................ | G01C 15/002 33/286 |
| 2012/0327662 A1 * | 12/2012 | Dang | ................. | G02B 19/0028 362/343 |

(Continued)

FOREIGN PATENT DOCUMENTS

| | | | | |
|---|---|---|---|---|
| CN | 109313257 A | * | 2/2019 | ............ G01J 3/0289 |
| CN | 111337899 A | * | 6/2020 | ............. G01S 7/481 |

*Primary Examiner* — Hovhannes Baghdasaryan
(74) *Attorney, Agent, or Firm* — BAYES PLLC (57) ABSTRACT

Embodiments of the disclosure provide a transmitter containing an omni-view peripheral scanning system, an omni-view peripheral scanning system, and an optical sensing method. The optical sensing system includes an optical source configured to sequentially emit optical signals. The optical sensing system further includes an omni-view peripheral scanning system configured to receive the optical signals and sequentially direct the optical signals towards an environment following a peripheral scanning pattern. The peripheral scanning system may include a scanning mirror and a top reflector. Each optical signal may pass through the top reflector towards the scanning mirror, where the scanning mirror is configured to reflect the optical signal back onto the top reflector following a spiral pattern and the top reflector is configured to direct the optical signal towards the environment. The optical sensing system further includes a receiver configured to receive at least a portion of the optical signals reflected from the environment.

20 Claims, 8 Drawing Sheets

(56) References Cited

U.S. PATENT DOCUMENTS

2014/0078519 A1\* 3/2014 Steffey .................... G01S 17/89
                                                           356/625
2016/0299335 A1\* 10/2016 Hofmann ............. G02B 26/101
2019/0331775 A1\* 10/2019 Song .................... G01S 7/4816

\* cited by examiner

OMNI-VIEW PERIPHERAL SCANNING SYSTEM WITH INTEGRATED MEMS SPIRAL SCANNER

TECHNICAL FIELD

The present disclosure relates to a light detection and ranging (LiDAR) system, and more particularly to, an omni-view peripheral scanning system with an integrated MEMS spiral scanner for the LiDAR system.

BACKGROUND

For a LiDAR system mounted on a certain vehicle (e.g., a robotaxi), it is usually beneficial to have a wide horizontal field of view (e.g., up to 360 degrees) to detect objects in a wide range of directions surrounding the vehicle. However, this could be challenging for current scanner-based solid-state LiDAR systems, as most of the scanners in these LIDAR systems cannot scan with an angular view larger than 120 degrees, not to mention 360 degrees. To achieve a near 360-degree horizontal field of view, a vehicle needs to mount multiple LiDAR units on the vehicle. This unavoidably adds complexity, cost, and alignment issues to the sensing system used by the vehicle.

Embodiments of the disclosure address the above problems by including an omni-view peripheral scanning system in a LiDAR system.

SUMMARY

Embodiments of the disclosure provide an exemplary optical sensing system. The optical sensing system includes an optical source, configured to sequentially emit optical signals. The optical sensing system further includes an omni-view peripheral scanning system, configured to receive the optical signals and sequentially direct the optical signals towards an environment following a peripheral scanning pattern. The peripheral scanning system includes a scanning mirror and a top reflector. Each optical signal passes through the top reflector towards the scanning mirror, where the scanning mirror is configured to reflect the optical signal back onto the top reflector following a spiral pattern. The top reflector is configured to direct the optical signal towards the environment. The optical sensing system additionally includes a receiver, configured to receive at least a portion of the optical signals reflected from the environment.

Embodiments of the disclosure also provide an exemplary optical sensing method. The method includes sequentially emitting, by an optical source, optical signals, where the optical signals pass through a top reflector towards a scanning mirror. The method further includes reflecting the optical signals, by the scanning mirror, back towards the top reflector. The method additionally includes directing, by the top reflector, the optical signals towards an environment following a peripheral scanning pattern. The method additionally includes receiving, by a receiver, at least a portion of the optical signals reflected from the environment surrounding the optical sensing system.

Embodiments of the disclosure further provide an exemplary omni-view peripheral scanning system. The omni-view peripheral scanning system includes a scanning mirror, and a plurality of MEMS (micro-electro-mechanical systems)-based comb drive actuators that hold the scanning mirror, where the plurality of MEMS-based comb drive actuators are configured to tilt the scanning mirror to different normal directions. The omni-view peripheral scanning system further includes a top reflector that includes a reflecting surface facing the scanning mirror. The top reflector is configured to pass optical signals towards the scanning mirror, where the scanning mirror is configured to reflect the optical signals back onto the reflecting surface of the top reflector. The reflecting surface of the top reflector is configured to direct the optical signals towards predetermined directions.

It is to be understood that both the foregoing general description and the following detailed description are exemplary and explanatory only and are not restrictive of the present disclosure, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Embodiments of the present disclosure provide an omni-view peripheral scanning system with an integrated MEMS spiral scanner in a transmitter of a LiDAR system. According to one example, the omni-view peripheral scanning system with the integrated MEMS spiral scanner may be disposed after the collimation lens in a transmitter of a LIDAR system. The omni-view peripheral scanning system with the integrated MEMS spiral scanner may include a top reflector along the optical axis of the transmitter and a scanning mirror facing the top reflector. The top reflector may include a via hole along the optical axis of the transmitter, which allows optical signals collimated by the collimation lens to pass through the top reflector towards the top surface of the scanning mirror. The optical signals passed through the top reflector may reach the top surface of the scanning mirror facing the top reflector. The scanning mirror may then reflect the received optical signals back to the top reflector. When reflecting the optical signals, the scanning mirror is tilted to certain normal directions (i.e., directions perpendicular to the plane of the scanning mirror), so that it is not exactly perpendicular to the incident optical signals, and thus the reflected optical signals do not reflect directly back to the via hole but rather reach a cone-shaped reflecting surface surrounding the via hole of the top reflector. When properly controlled, the reflected optical signals may follow a certain pattern (e.g., a spiral pattern) when being reflected onto the cone-shaped reflecting surface of the top reflector. The cone-shaped reflecting surface may further reflect the optical signals towards an environment surrounding the LIDAR system.

In some embodiments, by following a pattern (e.g., a spiral pattern) when reaching the cone-shaped reflecting surface, the optical signals reflected, by the cone-shaped reflecting surface, to the environment may achieve an omni-view peripheral scanning pattern, e.g., up to a 360-degree horizontal field of view. Accordingly, the disclosed omni-view peripheral scanning system may achieve up to a 360-degree horizontal field of view in a single LIDAR unit without requiring multiple LIDAR units. This then saves the cost and simplifies the configuration including the alignment issues faced by the optical sensing system of a vehicle.

The features and advantages described herein are not all-inclusive and many additional features and advantages will be apparent to one of ordinary skill in the art in view of the figures and the following descriptions.

The disclosed LiDAR system containing an omni-view peripheral scanning system with the integrated MEMS spiral scanner can be used in many applications. For example, the disclosed LiDAR system can be used in advanced navigation technologies, such as to aid autonomous driving or to generate high-definition maps, in which the optical sensing system can be equipped on a vehicle.

Figure 1:
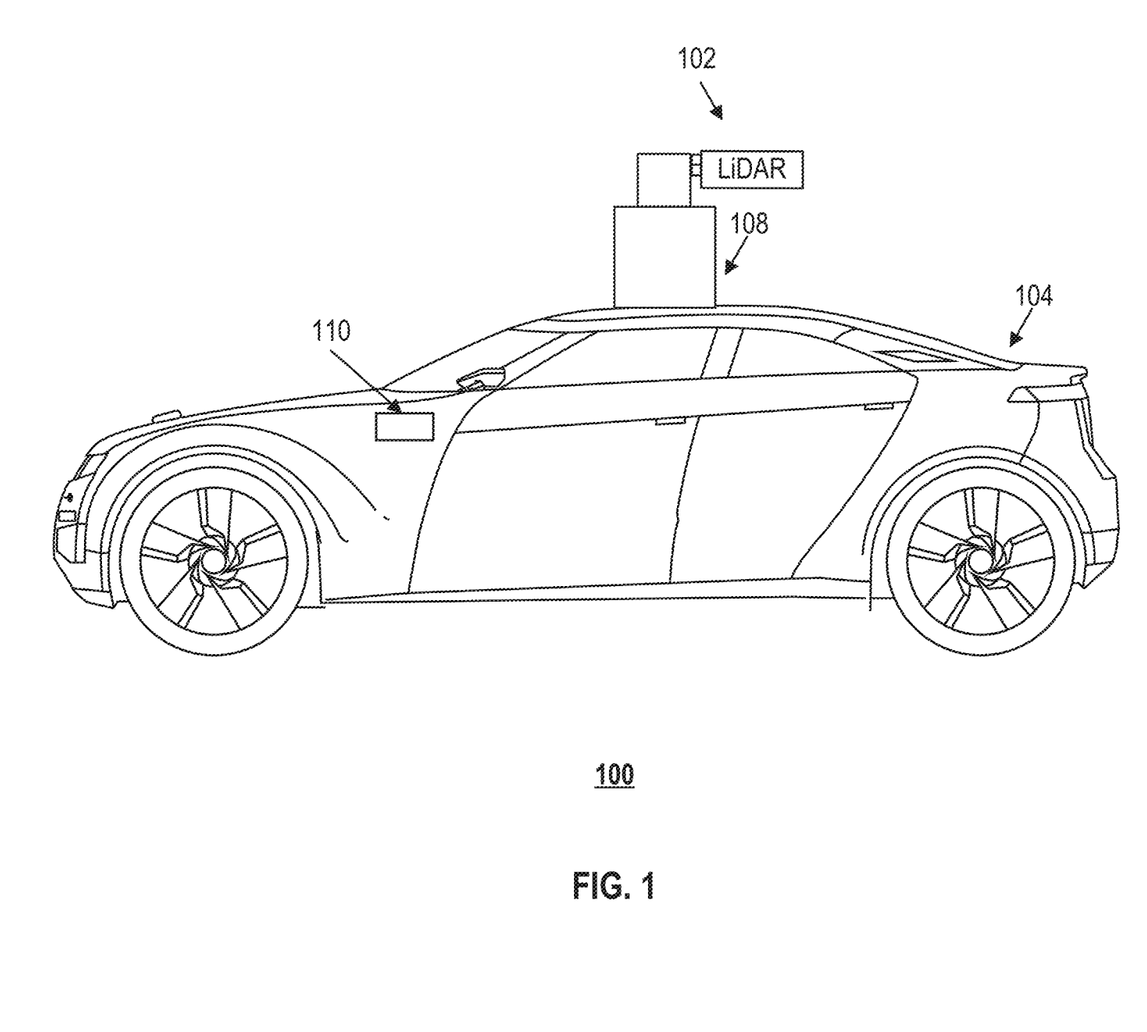
FIG. 1 illustrates a schematic diagram of an exemplary vehicle equipped with a LiDAR system containing an omni-view peripheral scanning system with an integrated MEMS spiral scanner, according to embodiments of the disclosure.

FIG. 1 illustrates a schematic diagram of an exemplary vehicle equipped with an optical sensing system containing an omni-view peripheral scanning system with an integrated MEMS spiral scanner, according to embodiments of the disclosure. Consistent with some embodiments, vehicle 100 may be a survey vehicle configured for acquiring data for constructing a high-definition map or 3-D buildings and city modeling. Vehicle 100 may also be an autonomous driving vehicle.

As illustrated in FIG. 1, vehicle 100 may be equipped with an optical sensing system, e.g., a LiDAR system 102 (also referred to as "LiDAR system 102" hereinafter) mounted to a body 104 via a mounting structure 108. Mounting structure 108 may be an electro-mechanical device installed or otherwise attached to body 104 of vehicle 100. In some embodiments of the present disclosure, mounting structure 108 may use screws, adhesives, or another mounting mechanism. Vehicle 100 may be additionally equipped with a sensor 110 inside or outside body 104 using any suitable mounting mechanisms. Sensor 110 may include sensors used in a navigation unit, such as a Global Positioning System (GPS) receiver and one or more Inertial Measurement Unit (IMU) sensors. It is contemplated that the manners in which LiDAR system 102 or sensor 110 can be equipped on vehicle 100 are not limited by the example shown in FIG. 1 and may be modified depending on the types of LiDAR system 102 and sensor 110 and/or vehicle 100 to achieve desirable 3D sensing performance.

Consistent with some embodiments, LiDAR system 102 and sensor 110 may be configured to capture data as vehicle 100 moves along a trajectory. For example, an omni-view peripheral scanning system of LiDAR system 102 may be configured to scan the surrounding environment. LiDAR system 102 measures distance to a target by illuminating the target with laser beams and measuring the reflected/scattered pulses with a receiver. The laser beams used for LiDAR system 102 may be ultraviolet, visible, or near-infrared, and may be pulsed or continuous wave laser beams. In some embodiments of the present disclosure, LiDAR system 102 may capture point clouds including depth information of the objects in the surrounding environment, which may be used for constructing a high-definition map or 3-D buildings and city modeling. As vehicle 100 moves along the trajectory, LiDAR system 102 may continuously capture data including the depth information of the surrounding objects (such as moving vehicles, buildings, road signs, pedestrians, etc.) for map, building, or city modeling construction.

Figure 2:
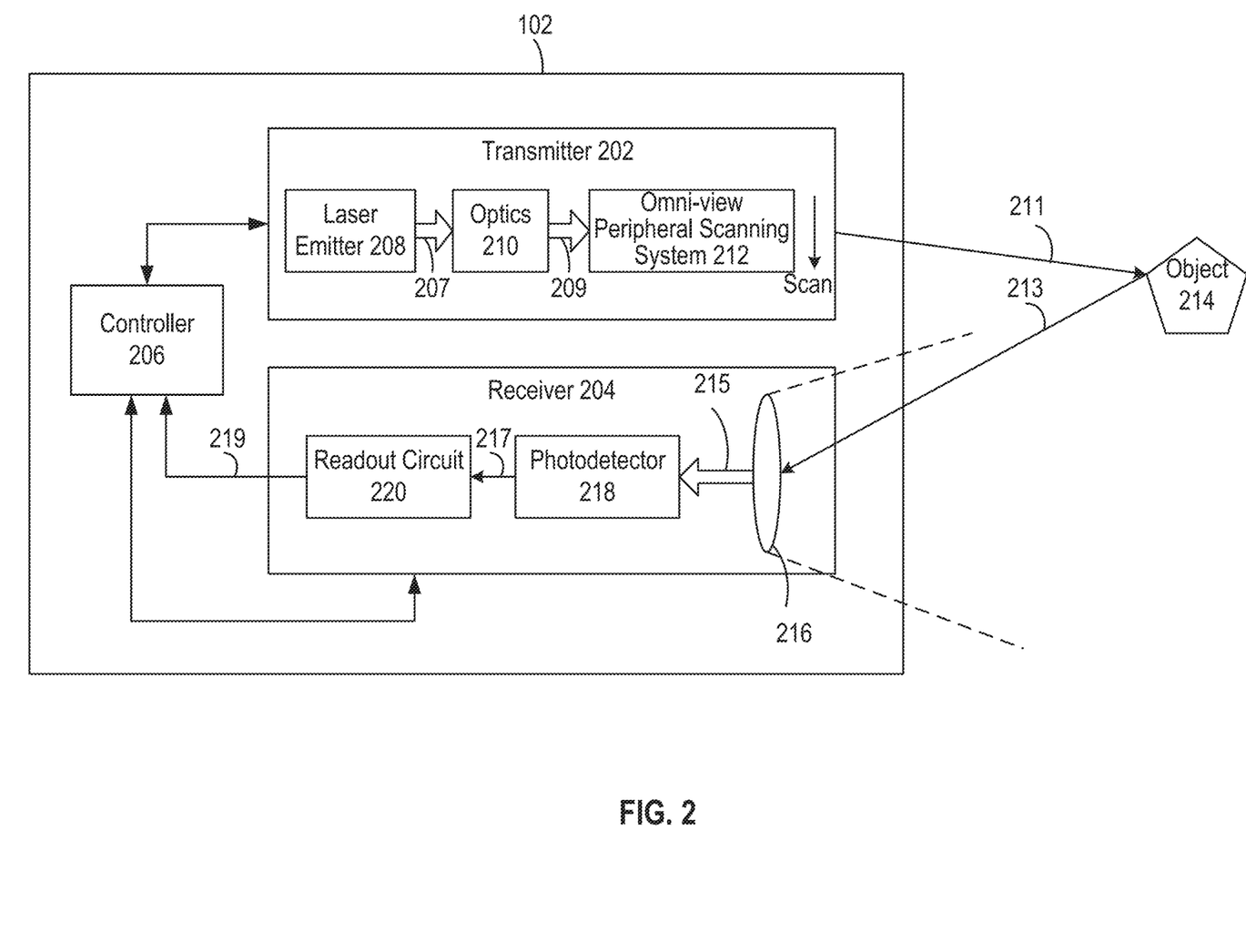
FIG. 2 illustrates a block diagram of an exemplary LiDAR system containing an omni-view peripheral scanning system with an integrated MEMS spiral scanner, according to embodiments of the disclosure.

FIG. 2 illustrates a block diagram of an exemplary LiDAR system containing an omni-view peripheral scanning system with the integrated MEMS spiral scanner, according to embodiments of the disclosure. In some embodiments, LiDAR system 102 may be a scanning flash LiDAR, a semi-coaxial LiDAR, a coaxial LiDAR, etc. As illustrated, LiDAR system 102 may include a transmitter 202, a receiver 204, and a controller 206 coupled to transmitter 202 and receiver 204. Transmitter 202 may further include a laser emitter 208 for emitting an optical signal and one or more optics 210 for collimating the optical signal. In some embodiments, transmitter 202 may additionally include an omni-view peripheral scanning system 212 for steering the collimated optical signal according to a certain pattern. Receiver 204 may further include a receiving lens 216, a photodetector 218, and a readout circuit 220.

Transmitter 202 may emit optical beams (e.g., pulsed laser beams, continuous wave (CW) beams, frequency modulated continuous wave (FMCW) beams) along multiple directions, e.g., up to a 360-degree horizontal field of view. Transmitter 202 may include a laser emitter 208, one or more optics 210, and an omni-view peripheral scanning system 212. According to one example, transmitter 202 may sequentially emit a stream of laser beams in an omni-view vertical field-of-view (FOV) that can be up to 360 degrees.

Laser emitter 208 may be configured to emit laser beams 207 (also referred to as "native laser beams") to optics 210. For instance, laser emitter 208 may generate laser beams in the ultraviolet, visible, or near-infrared wavelength range, and provide the generated laser beams to optics 210. In some embodiments of the disclosure, depending on underlying laser technology used for generating laser beams, laser emitter 208 may include one or more of a double heterostructure (DH) laser emitter, a quantum well laser emitter, a quantum cascade laser emitter, an interband cascade (ICL) laser emitter, a separate confinement heterostructure (SCH) laser emitter, a distributed Bragg reflector (DBR) laser emitter, a distributed feedback (DFB) laser emitter, a vertical-cavity surface-emitting laser (VCSEL) emitter, a vertical-external-cavity surface-emitting laser (VECSEL) emitter, an extern-cavity diode laser emitter, etc., or any combination thereof. Depending on the number of laser emitting units in a package, laser emitter 208 may include a single emitter containing a single light-emitting unit, a multi-emitter unit containing multiple single emitters packaged in a single chip, an emitter array or laser diode bar containing multiple (e.g., 10, 20, 30, 40, 50, etc.) single emitters in a single substrate, an emitter stack containing multiple laser diode bars or emitter arrays vertically and/or horizontally built up in a single package, etc., or any combination thereof. Depending on the operating time, laser emitter 208 may include one or more of a pulsed laser diode (PLD), a CW laser diode, a Quasi-CW laser diode, etc., or any combination thereof. Depending on the semiconductor materials of diodes in laser emitter 208, the wavelength of incident laser beams 207 may be at different values, such as 760 nm, 785 nm, 808 nm, 848 nm, 870 nm, 905 nm, 940 nm, 980 nm, 1064 nm, 1083 nm, 1310 nm, 1370 nm, 1480 nm, 1512 nm, 1550 nm, 1625 nm, 1654 nm, 1877 nm, 1940 nm, 2000 nm, etc. It is understood that any suitable laser source may be used as laser emitter 208 for emitting laser beams 207 at a proper wavelength.

Optics 210 may include optical components (e.g., lenses, mirrors) that can shape the laser light and collimate the laser light into a narrow laser beam 209 to increase the scan resolution and the range to scan object(s) 214. Omni-view peripheral scanning system 212 may include various optical elements such as prisms, mirrors, gratings, optical phased array (e.g., liquid crystal-controlled grating), or any combination thereof. Consistent with embodiments of the disclosure, omni-view peripheral scanning system 212 in LiDAR system 102 may include a top reflector and a scanning mirror facing the top reflector as described earlier. In some embodiments, object(s) 214 may be made of a wide range of materials including, for example, non-metallic objects, rocks, rain, chemical compounds, aerosols, clouds, and even single molecules. In some embodiments, at each time point during the scan, the top reflector and the scanning mirror may collaboratively steer laser beams 211 to object(s) 214 in a peripheral scanning pattern by tilting the scanning mirror to different normal directions, as described in more detail in FIGS. 3-8.

Receiver 204 may be configured to detect returned laser beams 213 returned from object 214. Upon contact, laser light can be reflected/scattered by object 214 via backscattering, such as Raman scattering, and fluorescence. Returned laser beams 213 may be in a same or different direction from laser beams 211. In some embodiments, receiver 204 may collect laser beams returned from object 214 and output signals reflecting the intensity of the returned laser beams.

As illustrated in FIG. 2, receiver 204 may include a receiving lens 216, a photodetector 218, and a readout circuit 220. Receiving lens 216 may be configured to focus the converge and focus the returning optical signal on photodetector 218 as a focused laser beam 215.

Photodetector 218 may be configured to detect the focused laser beams 215. In some embodiments, photodetector 218 may convert a laser beam 215 into an electrical signal 217 (e.g., a current or a voltage signal). Electrical signal 217 may be an analog signal which is generated when photons are absorbed in a photodiode included in photodetector 218. In some embodiments, photodetector 218 may include a PIN detector, an avalanche photodiode (APD) detector, a single photon avalanche diode (SPAD) detector, a silicon photo multiplier (SiPM) detector, or the like. In some embodiments, photodetector 218 may include a plurality of photosensors or pixels arranged in a one-dimensional or two-dimensional array.

Readout circuit 220 may be configured to integrate, amplify, filter, and/or multiplex signal detected by photodetector 218 and transfer the integrated, amplified, filtered, and/or multiplexed signal 219 onto an output port (e.g., controller 206) for readout. In some embodiments, readout circuit 220 may act as an interface between photodetector 218 and a signal processing unit (e.g., controller 206). Depending on the configurations, readout circuit 220 may include one or more of a transimpedance amplifier (TIA), an analog-to-digital converter (ADC), a time-to-digital converter (TDC), or the like.

Controller 206 may be configured to control transmitter 202 and/or receiver 204 to perform detection/sensing operations. For instance, controller 206 may control laser emitter 208 to emit laser beams 207, or control omni-view peripheral scanning system 212 to scan in an omni-view peripheral scanning pattern. In some embodiments, controller 206 may also control data acquisition and perform data analysis. For instance, controller 206 may collect digitalized signal information from readout circuit 220, determine the distance of object 214 from LiDAR system 102 according to the travel time of laser beams, and construct a high-definition map or 3-D buildings and city modeling surrounding LiDAR system 102 based on the distance information of object(s) 214. In some embodiments, controller 206 may be further coupled to omni-view peripheral scanning system 212 to control operation of the omni-view peripheral scanning system, as further described in detail below.

Figure 3:
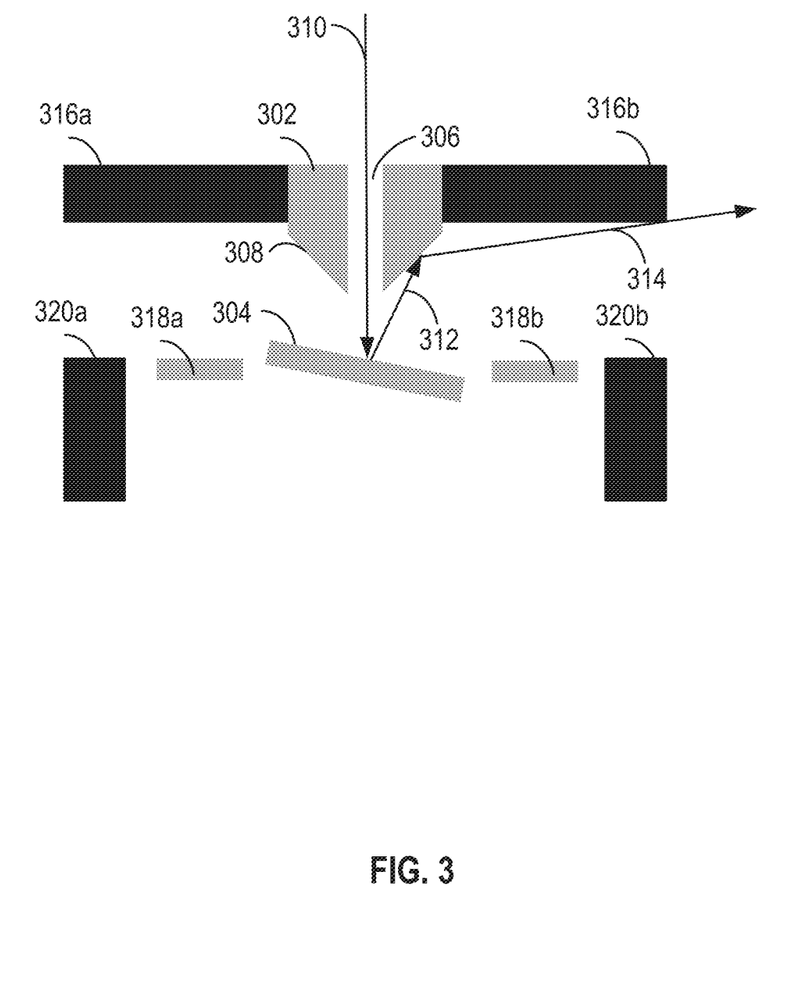
FIG. 3 illustrates a schematic diagram of a cross-section view of an exemplary omni-view peripheral scanning system with an integrated MEMS spiral scanner, according to embodiments of the disclosure.

FIG. 3 illustrates a cross-section view of an exemplary omni-view peripheral scanning system 212, according to embodiments of the disclosure. As illustrated in FIG. 3, an omni-view peripheral scanning system 212 may include a top reflector 302 and a scanning mirror 304. Top reflector 302 may further include a via hole 306 along a central axis of top reflector 302. In addition, top reflector 302 may include a cone-shaped reflecting surface 308 that faces scanning mirror 304. In some embodiments, top reflector 302 may be fixed to anchors 316a and 316b, which may be implemented as separate pieces as illustrated in FIG. 3, or may be implemented as a single piece. Scanning mirror 304 may be a movable mirror that can be tilted to different normal directions in three-dimension (3D) at any moment during a scanning process. The movement of scanning mirror 304 may be controlled by a set of vertical circular comb drive actuators 318a and 318b, or by other controlling mechanisms. Similarly, comb drive actuators 318a and 318b may be also mounted onto anchors 320a and 320b respectively. Anchors 320a and 320b may also be implemented as separate pieces as illustrated in FIG. 3, or may be implemented as a single piece.

In one example, a laser beam 310 may pass through via hole 306 and reach the top surface of scanning mirror 304. Scanning mirror 304 may be tilted to a certain normal direction (i.e., a direction perpendicular to a plane of the scanning mirror surface) when laser beam 310 reaches the top surface of scanning mirror 304, and thus reflect laser beam 310 at a certain angle and direction with respect to incident laser beam 310, e.g., as a laser beam 312 as shown in FIG. 3. Reflected laser beam 312 may reach cone-shaped reflecting surface 308, which may further reflect the reflected laser beam 312 towards the environment, e.g., as a laser beam 316 as shown in FIG. 3. In some embodiments, scanning mirror 304 may be tilted to different normal directions in 3D at different moments, and thus laser beam 312 may reach different parts of cone-shaped reflecting surface 308. When scanning mirror 304 is continuously tilted according to a certain pattern, laser beams 312 may continuously reach cone-shaped reflecting surface 308 in a specific pattern, e.g., in a spiral pattern that runs from bottom to top (or from top to bottom) of cone-shaped reflecting surface 308.

In some embodiments, top reflector 302 may be fixed to anchors 316a and 316b that hold a partial or full portion of top reflector 302 other than cone-shaped reflecting surface 308, as illustrated in FIG. 3. In some embodiments, when top reflector 302 is fixed to anchors 316a and 316b, via hole 306 of top reflector 302 may be aligned with incoming optical signals, such that optical signals can pass through via hole 306 towards scanning mirror 304. For instance, via hole 306 may be aligned with a laser beam 310 collimated by optics 210.

In some embodiments, the cross-section of via hole 306 of top reflector 302, in a direction perpendicular to the via hole 306, may be in different shapes, such as circular, ellipse, square, rectangular, or the like. In some embodiments, the size of via hole 306 may be large enough to allow collimated optical signals to pass through via hole 306. In some embodiments, the size of via hole 306 may be as small as possible so that more area on cone-shaped reflecting surface 308 will be available for reflecting optical signals towards the environment.

In some embodiments, the cone shape of cone-shaped reflecting surface 308 may have a fixed apex angle. For instance, the apex angle of cone-shaped reflecting surface 308 may be any angle between 0° and 90°, such as 10°, 15°, 20°, 25°, 30°, 35°, 40°, 45°, 50°, 55°, 60°, 65°, 70°, 75°, 80°, etc. In some embodiments, a smaller apex angle may be used by a LIDAR system with a focus on scanning areas that have a larger distance, while a larger apex angle may be used by a LIDAR system with a focus on scanning areas that have a smaller distance from the LIDAR system.

In some embodiments, the apex angle and height of the cone shape of cone-shaped reflecting surface 308 may be adjustable. For instance, in some embodiments, the top portion and the cone portion of top reflector 302 may be separate pieces that are slidably connected and may operate in an "umbrella" style. That is, when the top portion of top reflector 302 is pushed towards or pulled away from the bottom cone portion, the apex angle may change accordingly, which then causes the scanning area of disclosed omni-view peripheral scanning system to change consequentially. This may in turn allow the scanning area of the disclosed omni-view peripheral scanning system to be dynamically adjusted. For instance, when a vehicle with the disclosed omni-view peripheral scanning system moves to an urban area, top reflector 302 in the omni-view peripheral scanning system may increase its apex angle (e.g., by "pushing" the cone portion towards the cone portion), so that the scanning is more focused on the areas close to the vehicle. On the other hand, if the vehicle moves to a rural area, top reflector 302 in the omni-view peripheral scanning system may decrease its apex angle (e.g., by "pulling" the top portion away from the cone portion), so that the scanning is more focused on the areas that are further away from the vehicle.

In some embodiments, cone-shaped reflecting surface 308 may include a layer of reflecting material for reflecting optical signals. The coated reflecting material on cone-shaped reflecting surface 308 may have a high reflectivity, e.g., over 95%, and may be a same material as or a different material from that used on top of scanning mirror 304. In one example, the coating reflecting material may be polished anodized aluminum, mylar, silver, nickel, chromium, etc. In some embodiments, various processes, such as sputtering or evaporation, may be used for depositing reflective materials on cone-shaped reflecting surface 308.

With respect to scanning mirror 304, it may also have different shapes, such as circular, ellipse, square, rectangular, or the like. In order not to waste any incident optical signals, the size of the top surface of scanning mirror 304 may be at least larger than the size of via hole 306. As previously described, the reflecting material on the top surface of scanning mirror 304 may be the same as or different from the material used on cone-shaped reflecting surface 308. In some embodiments, scanning mirror 304 may be mounted onto a platform containing a set of comb drive actuators that control the motion of scanning mirror 304, as further described below with respect to FIGS. 4A-4B.

Figure 4A:
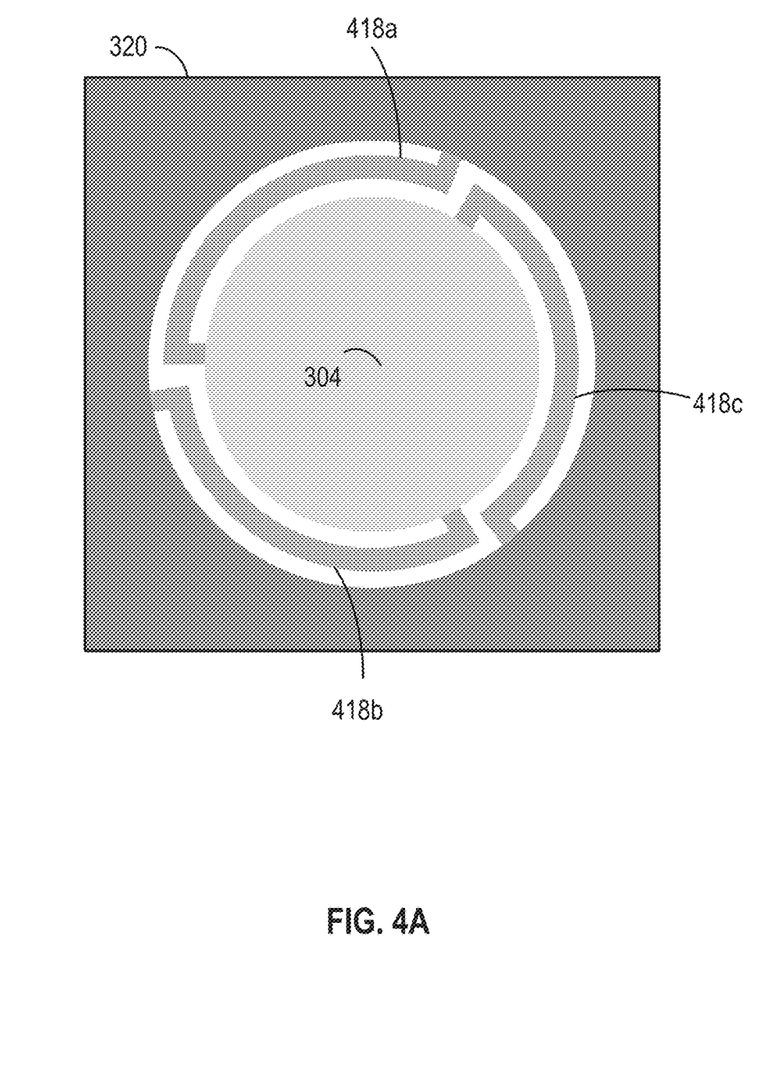
FIG. 4A illustrates a schematic diagram of an exemplary integrated MEMS spiral scanner, according to embodiments of the disclosure.
Figure 4B:
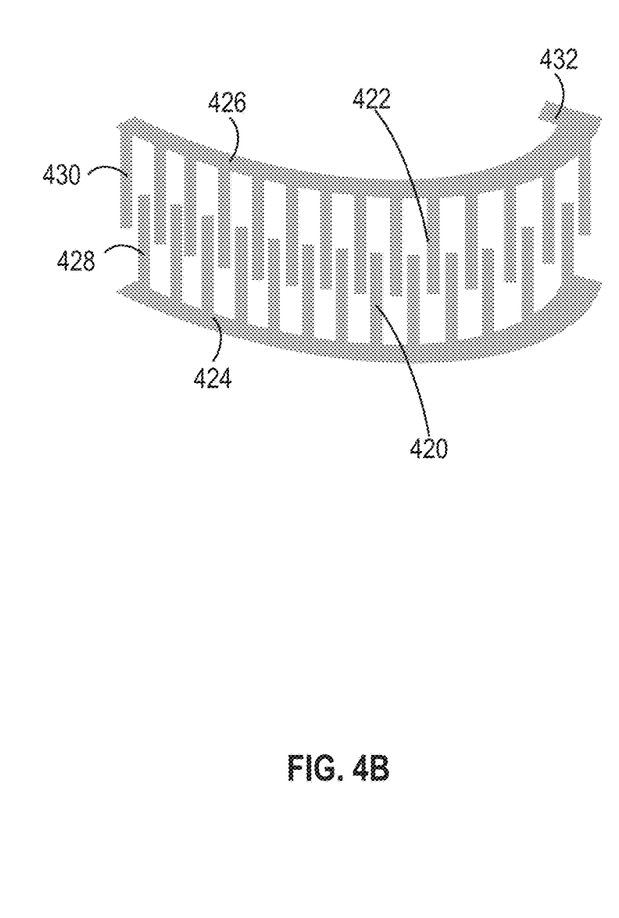
FIG. 4B illustrates a schematic diagram of an exemplary circular vertical comb drive actuator, according to embodiments of the disclosure.

FIGS. 4A-4B collectively illustrate a schematic diagram of an exemplary scanning mirror 304 integrated into a comb drive actuators-based platform, according to embodiments of the disclosure. In the illustrated embodiment, scanning mirror 304 may be a circular mirror, and there are three comb drive actuators that collaboratively control the motion of scanning mirror 304. It is to be noted that, while the comb drive actuators are described as MEMS-actuated in FIGS. 4A-4B and other parts of the specification, the disclosure is not limited to such actuation mechanism, and may include any other suitable actuation mechanisms for actuating the described vertical comb drives. These other actuation mechanisms may include electro-thermal, piezo-electric, and electro-magnetic actuation mechanisms, and the like.

As illustrated in FIG. 4A, scanning mirror 304 may be located at the center of the platform surrounded by three comb drive actuators 418a, 418b, and 418c (together or individually may be referred to as "comb drive actuator 418"). Each comb drive actuator 418 may include a stationary comb that is fixed to an anchor 320 and a movable comb that holds scanning mirror 304. According to one embodiment, a comb drive actuator 418 may be a vertical circular comb drive actuator as illustrated in FIG. 4B.

FIG. 4B illustrates an exemplary vertical circular comb drive actuator, according to embodiments of the disclosure. As illustrated, a vertical circular comb drive actuator may include an arc-shaped stationary comb 420 and an arc-shaped movable comb 422. Each stationary comb 420 and movable comb 422 may include a respective anchor 424 and 426 and a respective set of teeth 428 and 430 that extend vertically and interleave with each other. Anchor 424 of stationary comb 420 may be an integral part of, or a separate component fixed to, anchor 320 that holds the whole platform including the three comb drive actuators 418. Anchor 426 of movable comb 422 may hold scanning mirror 304 at one point, e.g., at one end of anchor 426 through a beam 432 as shown in FIG. 4B. In some embodiments, each of the three vertical circular comb drive actuators 418a, 418b, and 418c may include such a beam 432 that holds scanning mirror 304 at one point, so that the three comb drive actuators together may hold scanning mirror 304 and control its movement. In some embodiments, although not specifically illustrated, each vertical circular comb drive actuator 418 may further include a different anchor that holds the respective movable comb through a spring beam. The spring beam may allow the movable comb to move at certain distances in a vertical direction but not in other directions.

In some embodiments, although not specifically illustrated, anchor 424 and anchor 426 may respectively connect to a coupled anode and cathode, which may apply a voltage differential to anchor 424 and anchor 426. The applied voltage differential may drive movable comb 422 to move with respect to stationary comb 420. The distance of the vertical movement of movable comb 422 may correspond to the value of the applied voltage differential. That is, a higher voltage differential between anchor 424 and anchor 426 may cause a larger vertical movement, and a smaller voltage differential causes a smaller vertical movement of movable comb 422. In some embodiments, one or more controllers may be coupled to the comb drive actuators to control the voltage differentials to be applied to these comb drive actuators.

In some embodiments, voltage differentials applied to different comb drive actuators and thus the vertical movements of the respective movable combs may be at different phases. That is, at any moment during a scanning process, the three movable combs may be at different distances away from the respective stationary combs, which thus causes the three beams 432 for holding scanning mirror 304 to be at different vertical levels (e.g., with respect to the stationary combs). This may then cause the plane of scanning mirror 304 to tilt to a certain normal direction at each moment of the scanning process. In some embodiments, depending on which movable comb(s) is at a higher level and which movable comb(s) is at a lower level, scanning mirror 304 may tilt towards different normal directions. In addition, by controlling the vertical movement distance of each movable comb, the tilted normal directions of scanning mirror 304 at different moments may be further controlled.

Figure 5:
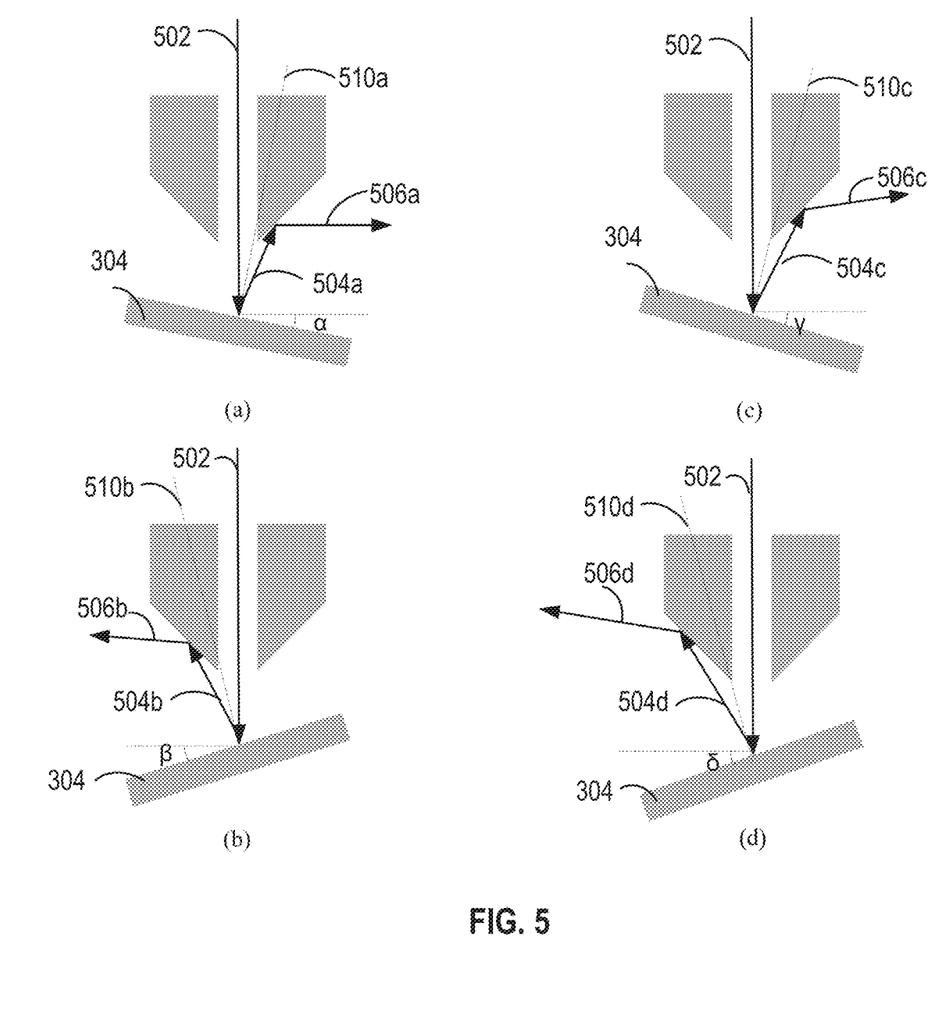
FIG. 5 illustrates a schematic diagram of exemplary scenarios for reflecting laser beams onto a top reflector of the omni-view peripheral scanning system at different directions and angles, according to embodiments of the disclosure.

FIG. 5 illustrates exemplary scenarios of scanning mirror tilted to different normal directions in one cross-sectional plane, according to embodiments of the disclosure. It is contemplated that the scanning mirror can be tilted to different normal directions in other cross-sectional planes as well. As a result, the scanning mirror can tilt in all normal directions in 3D. As illustrated in the figure, in part (a), the scanning mirror may tilt towards right at a tilt angle $\alpha$ and a corresponding normal direction 510$a$ deviating away from the incident laser beam direction, when movable comb(s) close to the right side moves to a lower location(s) while movable comb(s) close to the left side moves to a higher location(s). At this moment, when a laser beam 502 is incident on the surface of scanning mirror 304, scanning mirror 304 may reflect laser beam 502 as a laser beam 504$a$, which reaches a lower right point of cone-shaped reflecting surface 308. Cone-shaped reflecting surface 308 may further reflect laser beam 504$a$ as a laser beam 506$a$, which may be towards an area at the lower right side of the corresponding optical sensing system. In part (b) of FIG. 5, movable comb(s) close to the right side moves to a higher location(s) while movable comb(s) close to the left side moves to a lower location(s), and thus scanning mirror 304 may tilt at a tilt angle $\beta$ and a corresponding normal direction 510$b$. Angle $\beta$ may be relatively larger than angle $\alpha$ if the height difference between comb drive(s) close to left and right sides become larger when compared to that in part (a), and thus the normal direction 510$b$ deviates further away from the incident laser beam direction. At this moment, when a laser beam 502 is incident on the surface of scanning mirror 304, scanning mirror 304 may reflect laser beam as laser beam 504$b$, which reaches a lower left point of cone-shaped reflecting surface 308. However, this lower left point may be relatively higher than the lower right point shown in part (a). In part (c) of FIG. 5, comb drive(s) close to the left side moves again to a higher level(s) while comb drive(s) close to the right side moves to a lower level(s). Compared to part (a) and part (b), the height difference between movable combs becomes even larger, and thus the tilted angle $\gamma$ is larger than angle $\beta$ and even larger than angle $\alpha$, and the normal direction 510$c$ deviates further away from the incident laser beam direction when compared to normal directions 510$a$ and 510$b$. Accordingly, reflected laser beam 504$c$ may reach a right point higher than that shown in part (a), and reflected laser beam 506$c$ may be towards a right area higher than those shown in part (a) and part (b). Similarly, in part (d) of FIG. 5, the tilted angle $\delta$ becomes even larger and the normal direction 510$d$ deviates further away from the incident laser beam direction when compared to normal directions 510$a$, 510$b$, and 510$c$, and the thus reflected laser beam reaches a higher left point on cone-shaped reflecting surface 308, and reflected laser beam 506$d$ may towards a left area higher than those shown in parts (a)-(c).

It is to be noted, while parts (a)-(d) in FIG. 5 illustrate scenarios for the left side and right side scanning by discussing comb drive actuators located close to left or right side, it is merely for illustrative purposes. It is contemplated that the above discussed scenarios should be applied to all directions around the omni-view peripheral scanning system, since the three comb drive actuators are symmetrically distributed around scanning mirror 304 in a circle.

Figure 6A:
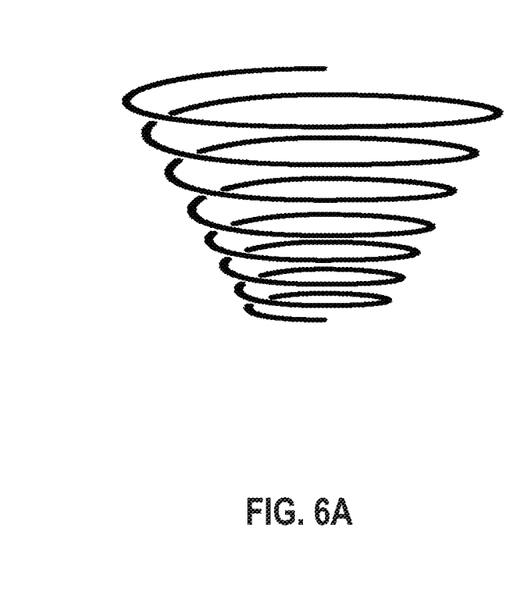
FIGS. 6A-6B illustrate schematic diagrams of exemplary patterns followed by an integrated MEMS spiral scanner when reflecting laser beams onto a top reflector of the omni-view peripheral scanning system, according to embodiments of the disclosure.

In some embodiments, when the vertical moving distance of each comb drive actuator becomes larger and larger while the three comb drive actuators move at different phases, laser beams 504 reflected by scanning mirror 304 may reach higher and higher around cone-shaped reflecting surface 308, thereby forming a spiral pattern as shown in FIG. 6A. Here, when the three comb drive actuators move at different phases, each comb drive actuator lags behind or moves ahead of an adjacent comb drive actuator by a ⅓ cycle, where a cycle is the time required for a comb drive actuator to complete an up and down movement. In general, if there are other numbers (e.g., N) of comb drive actuators, each comb drive actuator may lag behind or move ahead of an adjacent comb drive actuator by a 1/N cycle. Here N may be any integer larger than 3.

Figure 6B:
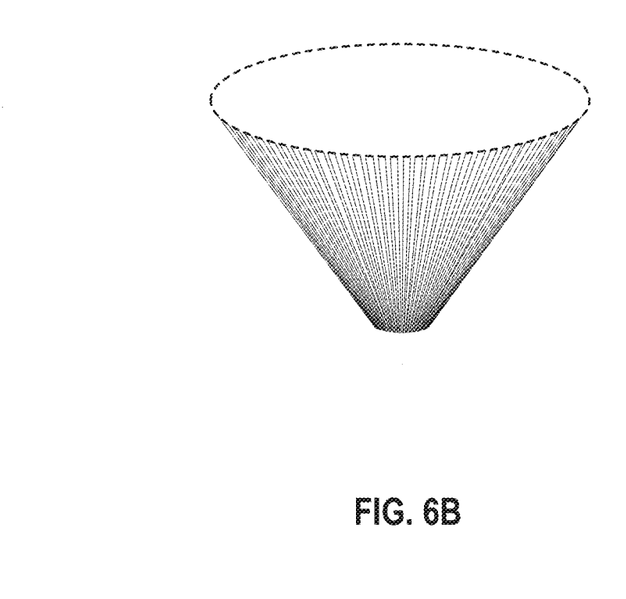

FIGS. 6A-6B illustrate exemplary patterns followed by an integrated MEMS spiral scanner when reflecting laser beams onto a top reflector of the omni-view peripheral scanning system, according to embodiments of the disclosure. Specifically, FIG. 6A illustrates a spiral pattern as discussed above with reference to FIG. 5. In this spiral pattern, laser beams reflected from scanning mirror 304 may reach cone-shaped reflecting surface 308 following a spiral pattern from bottom to top (or from top to bottom) of the cone shape of cone-shaped reflecting surface 308. This may be achieved by controlling the movements of the three comb drive actuators according to a predefined pattern. It is to be noted that the spiral pattern discussed above is merely one exemplary pattern for scanning mirror 304 to reflect laser beams towards cone-shaped reflecting surface 308. In some embodiments, patterns other than the spiral pattern illustrated in FIG. 6A may also be possible, if the comb drive actuators are properly controlled to move according to a specially designed pattern.

FIG. 6B illustrates another pattern in which laser beams may follow when reaching cone-shaped reflecting surface 308. In the illustrated pattern, instead of moving from bottom to top of cone-shaped reflecting surface 308 in a spiral pattern, laser beams reaching the cone-shaped reflecting surface may directly move from bottom to top (or from top to bottom) in a substantially vertical line, and then from top to bottom, and so on by gradually moving clockwise or anti-clockwise along the cone-shaped reflecting surface. To achieve this pattern, scanning mirror 304 may be controlled to tilt from a minimum angle to a maximum angle in one direction, and then from a maximum angle to a minimum angle in a next direction, and so on, where these directions may follow a clockwise pattern or an anti-clockwise pattern. In some embodiments, to control scanning mirror 304 to tilt according to a predefined pattern as discussed in FIGS.

6A-6B or in other patterns, one or more controller(s) coupled to these comb drive actuators may specifically control voltage differentials applied to the comb drive actuators in order to implement the specific patterns.

Figure 7:
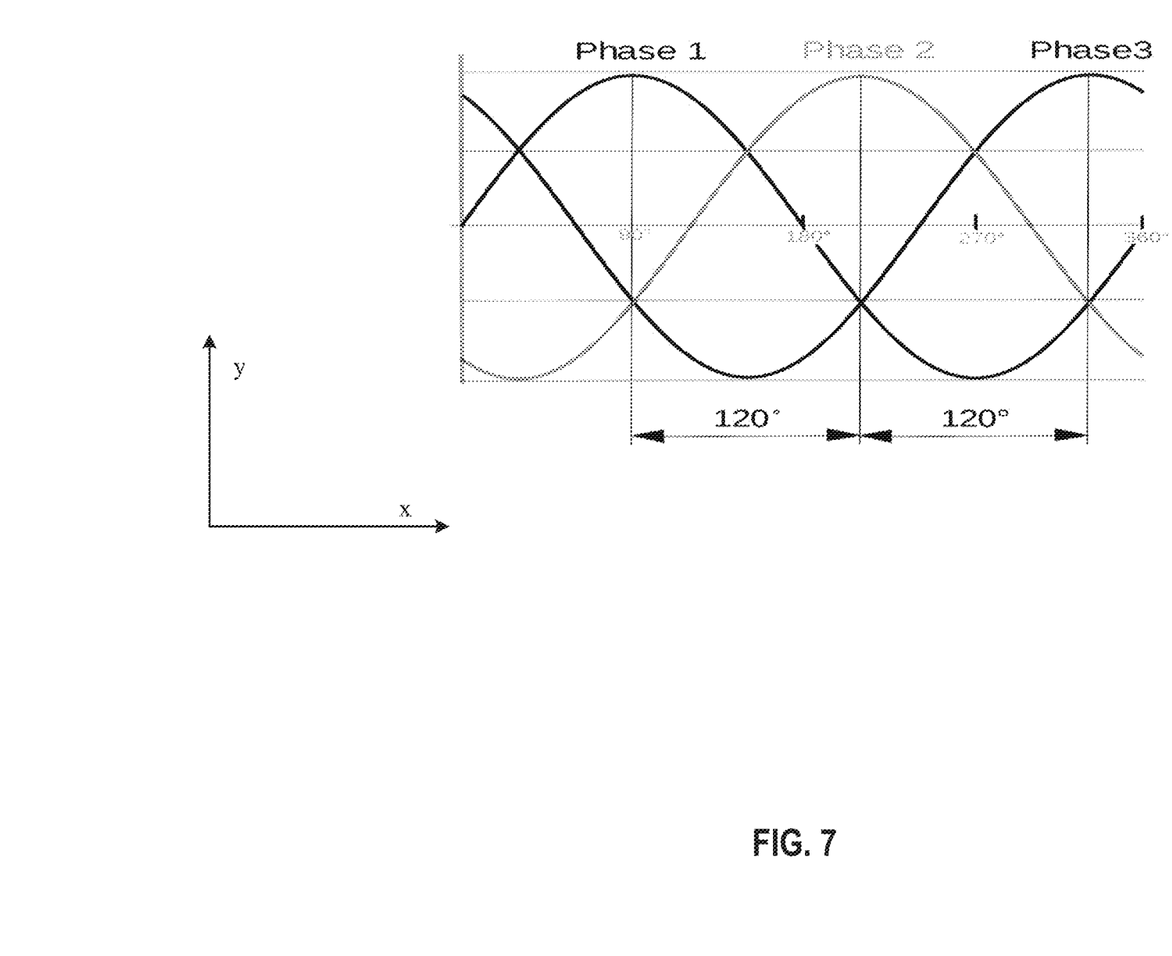
FIG. 7 illustrates a schematic diagram of exemplary voltage differentials applied to three comb drive actuators, according to embodiments of the disclosure.

FIG. 7 illustrates a schematic diagram of exemplary voltage differentials applied to three comb drive actuators, according to embodiments of the disclosure. The illustrated exemplary voltage differentials may be applied for controlling scanning mirror 304 to reflect laser beams onto cone-shaped reflecting surface 308 according to a spiral pattern shown in FIG. 6A. As illustrated, if the voltage differential applied to a first comb drive actuator follows a Phase 1 pattern in the figure, the voltage differential applied to an adjacent second comb drive actuator may then follow a Phase 2 pattern, and the voltage differential applied to a third comb drive actuator may follow a Phase 3 pattern shown in the figure. That is, the voltage differential applied to each comb drive actuator may always have a ⅓ cycle phase difference compared to the voltage differential applied to another adjacent comb drive actuator. Accordingly, since there is always a difference in voltage differentials applied to at least two of the three comb drive actuators, scanning mirror may always be tilted to a certain normal direction, and thus may always reflect laser beams at a certain angle towards cone-shaped reflecting surface 308.

It is to be noted that the exemplary voltage differentials applied to three comb drive actuators illustrated in FIG. 7 are merely for reflecting laser beams onto cone-shaped reflecting surface 308 as a circle. To form a predetermined spiral pattern, the maximum voltage differentials applied to the three comb drive actuators may gradually increase. That is, the amplitudes of the peaks for each phase are increasing one peak after another in the y-axis in FIG. 7 until the spiral pattern reaches the top of cone-shaped reflecting surface 308. At that moment, scanning mirror 304 may reflect laser beams onto the cone-shaped reflecting surface by restarting another spiral pattern from bottom to top. Alternatively, scanning mirror 304 may also reflect laser beams onto cone-shaped reflecting surface 308 from top to bottom of a spiral pattern, according to some embodiments of the disclosure.

It is to be noted that the controller(s) coupled to the comb drive actuators may be configured to control voltage differentials applied to the comb drive actuators according to different types of predefined patterns, and the voltage differentials shown in FIG. 7 are merely for illustrative purposes, but not for limitation. For example, the applied voltage differentials may have different waveforms, amplitudes, frequencies, and/or phase differences than the example shown in FIG. 7. Once these patterns of voltage differentials are applied to the comb drive actuators, the omni-view peripheral scanning system may be then applied to a LIDAR system in optical sensing.

Figure 8:
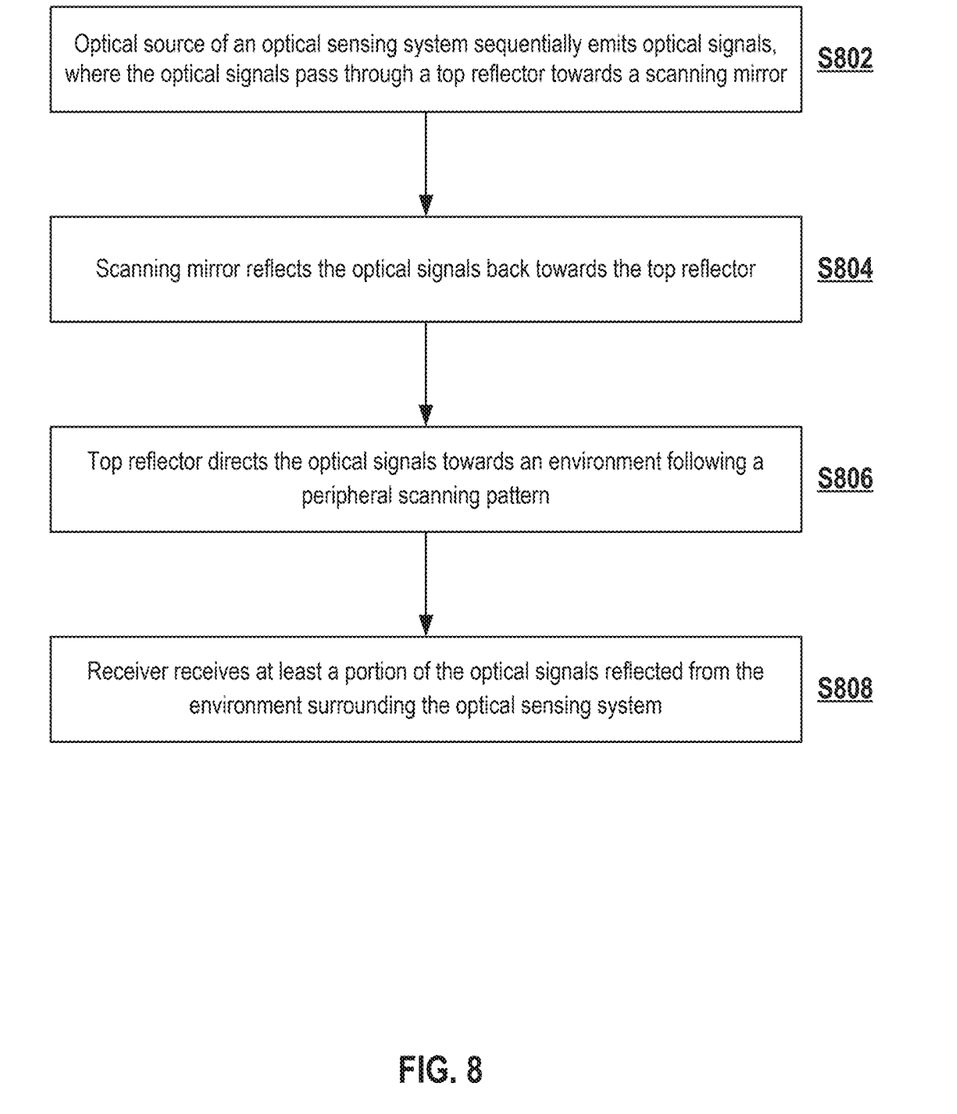
FIG. 8 is a flow chart of an exemplary optical sensing method performed by a LiDAR system containing an omni-view peripheral scanning system with an integrated MEMS spiral scanner, according to embodiments of the disclosure.

FIG. 8 is a flow chart of an exemplary optical sensing method 800 performed by a LiDAR system containing an omni-view peripheral scanning system, according to embodiments of the disclosure. In some embodiments, method 800 may be performed by various components of LiDAR system 102, e.g., transmitter 202 containing an omni-view peripheral scanning system 212, receiver 204, and/or controller 206. In some embodiments, method 800 may include steps S802-S808. It is to be appreciated that some of the steps may be optional. Further, some of the steps may be performed simultaneously, or in a different order than that shown in FIG. 8.

In step S802, an optical source (e.g., laser emitter 208) inside a transmitter of an optical sensing system (e.g., transmitter 202 of LiDAR system 102) may sequentially emit a series of optical signals. Here, the series of optical signals may be emitted by the optical source at a predefined time interval. In addition, the series of signals may have a same wavelength and have a same power during a certain period when the optical sensing system is sensing an environment surrounding the system.

In some embodiments, the transmitter may include an omni-view peripheral scanning system (e.g., omni-view peripheral scanning system 212) that contains a top reflector (e.g., top reflector 302) and a scanning mirror (e.g., scanning mirror 304) as previously described. The optical signals emitted by the optical source may pass through the top reflector, e.g., through a via hole 306, towards the scanning mirror.

In step S804, the scanning mirror may reflect the optical signals back to the top reflector. In some embodiments, when the scanning mirror reflects the optical signals back to the top reflector, since the scanning mirror is tilted to certain normal directions at different moments, the reflected optical signals may not reflect the optical signals directly back to the via hole, but rather reach a cone-shaped reflecting surface (e.g., cone-shaped reflecting surface 308) surrounding the via hole of the top reflector. When reflecting the optical signals, the scanning mirror may be sequentially tilted to different normal directions in 3D, which may cause the reflected optical signals to reach the cone-shaped reflecting surface following a certain pattern (e.g., a spiral pattern).

In step S806, the top reflector may direct the optical signals towards an environment following a peripheral scanning pattern. In some embodiments, when the optical signals reach the cone-shaped reflecting surface, the optical signals may be further reflected by the cone-shaped reflecting surface. The reflected optical signals may be transmitted towards the environment. In some embodiments, due to the cone shape of the reflecting surface, and due to the certain pattern (e.g., spiral pattern) followed by the optical signals when reaching the cone-shaped reflecting surface, the optical signals reflected into the environment may follow an omni-view peripheral scanning pattern (e.g., up to a 360-degree vertical field-of-view) that allows the objects from a wide range of directions surrounding the optical sensing system to be scanned by a single scanning system.

In step 808, a receiver of the optical sensing system may receive at least a portion of the optical signals reflected from the environment. The received portion of optical signals may follow a same path (e.g., in a coaxial LiDAR) or a different path (e.g., in a semi-coaxial LiDAR). When following a same path, the portion of optical signals may return from the environment towards the cone-shaped reflecting surface, which then reflects the portion of optical signals towards the scanning mirror, which further reflects the portion of optical signals into the via hole of the top reflector. After passing through the via hole of the top reflector, a beam splitter may reflect the returned portion of optical signals towards the receiver of the optical sensing system. The receiver of the optical sensing system may then detect the portion of optical signals, and forward the detected portion of optical signals for further processing, e.g., for constructing a high-definition map or 3-D buildings and city modeling.

Although the disclosure is made using a LiDAR system as an example, the disclosed embodiments may be adapted and implemented to other types of optical sensing systems that use transmitters to transmit optical signals and receivers to receive optical signals not limited to laser beams. For example, the embodiments may be readily adapted for optical imaging systems or radar detection systems that use electromagnetic waves to scan objects. These other optical sensing systems can also benefit from the disclosed systems and methods especially when an omni-view field of view is desired during scanning.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor-based, tape-based, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. An optical sensing system, comprising:
   an optical source, configured to sequentially emit optical signals;
   an omni-view peripheral scanning system, configured to receive the optical signals and sequentially direct the optical signals towards an environment following a peripheral scanning pattern, wherein the omni-view peripheral scanning system comprises a scanning mirror and a top reflector, wherein each optical signal passes through the top reflector towards the scanning mirror, wherein the scanning mirror is configured to reflect the optical signal back onto the top reflector following a spiral pattern, and the top reflector is configured to direct the optical signal towards the environment; and
   a receiver, configured to receive at least a portion of the optical signals reflected from the environment.

2. The optical sensing system of claim 1, further comprising a plurality of micro-electromechanical system (MEMS)-based comb drive actuators configured to tilt the scanning mirror to a certain normal direction.

3. The optical sensing system of claim 2, wherein the scanning mirror, when tilted by the MEMS-based comb drive actuators, reflects the optical signals toward the top reflector following the spiral pattern.

4. The optical sensing system of claim 1, wherein the top reflector comprises a cone-shaped reflecting surface that faces the scanning mirror.

5. The optical sensing system of claim 4, wherein the top reflector comprises a via hole along a central axis of the top reflector, the optical signals emitted from the optical source passing through the via hole towards the scanning mirror.

6. The optical sensing system of claim 1, wherein the scanning mirror is a circular mirror.

7. The optical sensing system of claim 2, wherein the plurality of MEMS-based comb drive actuators comprise three or more vertical circular comb drive actuators.

8. The optical sensing system of claim 2, wherein each of the plurality of MEMS-based comb drive actuators has one angular arm surrounding the scanning mirror, the angular arm having one end fixedly connected to the scanning mirror.

9. The optical sensing system of claim 2, wherein each MEMS-based comb drive actuator comprises a movable comb that moves vertically when a voltage differential is applied to the MEMS-based comb drive actuator.

10. The optical sensing system of claim 9, wherein a vertical movement pattern of the movable comb of each of the plurality of MEMS-based comb drive actuators has a different phase when tilting the scanning mirror to the certain normal direction.

11. The optical sensing system of claim 10, wherein a phase difference between every two adjacent MEMS-based comb drive actuators is determined based on a total number of the plurality of MEMS-based comb drive actuators.

12. The optical sensing system of claim 10, further comprising a controller coupled to the plurality of MEMS-based comb drive actuators, the controller being configured to control each of the plurality of MEMS-based comb drive actuators to move vertically at different phases.

13. An optical sensing method for an optical sensing system, comprising:
    sequentially emitting, by an optical source, optical signals, wherein the optical signals pass through a top reflector towards a scanning mirror;
    reflecting the optical signals, by the scanning mirror, back towards the top reflector;
    directing, by the top reflector, the optical signals towards an environment following a peripheral scanning pattern; and
    receiving, by a receiver, at least a portion of the optical signals reflected from the environment surrounding the optical sensing system.

14. The optical sensing method of claim 13, wherein reflecting the optical signals, by the scanning mirror, back towards the top reflector further comprises:
    tilting the scanning mirror to certain normal directions to allow the optical signals to reflect onto the top reflector following a spiral pattern.

15. The optical sensing method of claim 14, wherein tilting the scanning mirror to certain normal directions to allow the optical signals to reflect onto the top reflector following a spiral pattern further comprises:
    actuating the scanning mirror using a plurality of MEMS-based comb drive actuators configured to move vertically at different phases.

16. An omni-view peripheral scanning system, comprising:
    a scanning mirror;
    a plurality of MEMS-based comb drive actuators that hold the scanning mirror, the plurality of MEMS-based comb drive actuators configured to tilt the scanning mirror to different normal directions; and
    a top reflector that includes a reflecting surface facing the scanning mirror,
    wherein the top reflector is configured to pass optical signals towards the scanning mirror, wherein the scanning mirror is configured to reflect the optical signals back onto the reflecting surface of the top reflector, wherein the reflecting surface of the top reflector is configured to direct the optical signals towards predetermined directions.

17. The omni-view peripheral scanning system of claim 16, wherein the reflecting surface of the top reflector is a cone-shaped reflecting surface that faces the scanning mirror.

18. The omni-view peripheral scanning system of claim 17, wherein the top reflector comprises a via hole along a central axis of the top reflector, wherein the optical signals pass through the via hole towards the scanning mirror.

19. The omni-view peripheral scanning system of claim 16, wherein the plurality of MEMS-based comb drive actuators comprise three or more circular vertical comb drive actuators.

20. The omni-view peripheral scanning system of claim 16, wherein each MEMS-based comb drive actuator comprises a movable comb that moves vertically when a voltage differential is applied to the MEMS-based comb drive actuator.

* * * * *